United States Patent Office 3,428,415
Patented Feb. 18, 1969

3,428,415
PREPARATION OF HETEROPOLYTUNGSTIC AND HETEROPOLYMOLYBDIC ACIDS
Vincent Chiola and Clarence D. Vanderpool, Towanda, Pa., assignors to Sylvania Electric Products Inc., a corporation of Delaware
No Drawing. Filed Apr. 11, 1967, Ser. No. 629,889
U.S. Cl. 23—23                 17 Claims
Int. Cl. C01g 39/00, 41/00

ABSTRACT OF THE DISCLOSURE

Heteropolytungstic and heteropolymolybdic acids are prepared by effecting reaction, in the presence of a fluoride ion, between a water-soluble compound containing a tungstate or a molybdate radical, e.g., sodium or ammonium tungstates or molybdates, and a substance comprising the heteroatom to be introduced into the aforesaid heteropoly acids. Examples of such substances are those which are initially in the form of an oxide, hydroxide, or a salt with an inorganic acid, of the heteroatom; and particularly those having either inadequate watersolubility characteristics or which form insoluble products because of hydrolysis, decomposition, etc., Al, Sb, Cr, Co, Fe, Ni, Nb, Sn Ti and V are heteroatoms to which the invention is especially applicable as a means for introducing them into the aforementioned heteropoly acids.

The reaction is carried out in an aqueous medium with acidic conditions prevailing during at least the latter part of the reaction period. Typically the concentration of F ion is at least 0.1 (e.g., from ca. 0.5 to ca. 10) wt. percent, based on the weight of the total reaction mass. Reaction temp.: ca. 20° C. to ca. 100° C.

Cross-references

The following copending applications assigned to the same assignee as is the present invention are closely related in general subject matter to the present application. Our copending applications Ser. No. 435,070, filed Feb. 24, 1965 now U.S. Patent 3,361,518; Ser. Nos. 603,792 and 603,793, filed Dec. 22, 1966; also Ser. No. 605,177 of Vincent Chiola and Jerome G. Lawrence, filed Dec. 28, 1966.

This invention relates broadly to the preparation of heteropolytungstic and heteropolymolybdic acids. More particularly, it is concerned with a processing modification that facilitates the introduction of one or more heteroatoms (i.e., one or more foreign anions or atoms) into the structure of acids of tungsten and of molybdenum containing no heteroatoms thereby to obtain complex heteropoly acids of tungsten and of molybdenum that heretofore it has been extremely difficult to prepare if at all and, if so, then only in low yields. Still more particularly, the invention involves means for solubilizing various, otherwise insoluble (substantially insoluble), sources of heteroatoms whereby the heteroatoms are rendered more adaptable for incorporation into the complex structures of the heteropoly acids of tungsten and of molybdenum.

Heteropoly acids, including alkali-free (substantially alkali-free) heteropoly acids, are known. The classical method of making alkali-free acids of, for example, tungsten is, in general, similar to that described in Inorganic Synthesis (H. S. Booth, Ed., Inorganic Synthesis, vol. 1, McGraw-Hill Book Company, New York (1939), pp. 132–133). The method involves ether extraction of acidified sodium salt solutions followed by recovery of the heteropolytungstic acid from the ether complex (D. H. Brown, J. Chem. Soc., August 1962, pp. 3189–3193). Mair (J. Chem. Soc., 1950, p. 2364) describes modifications wherein mineral acid is added to alkali tungstate or alkali molybdate to convert, for example, the alkali tungstate to the paratungstate before further acidification to form the heteropoly acid.

In U.S. Patent No. 2,503,991, Bechtold discloses a process of preparing heteropoly acids wherein an aqueous solution containing a mixture of an alkali-metal phosphate with either an alkali-metal molybdate or tungstate, or containing a mixture of an alkali-metal silicate with an alkali-metal molybdate, is contacted with an organic or inorganic cation-exchange substance on the hydrogen cycle thereby to remove the alkali and convert the heteropoly salt to the corresponding heteropoly acid. In U.S. Patent No. 3,288,562 of John M. Laferty, Jr., there is disclosed a method of making phosphotungstic acid which involves first forming sodium metatungstate in aqueous solution, converting it to sodium phosphotungstate, and converting the latter to phosphotungstic acid by bringing the aqueous solution of sodium phosphotungstate into contact with a cation-exchange material on the hydrogen cycle.

From the foregoing, it will be seen that the prior art describes procedures for making heteropoly acids of tungsten and molybdenum that contain central atoms (i.e., heteroatoms) of phosphorus and silicon. Both P and Si have proved relatively easy to incorporate into alkali tungstate or alkali molybdate solutions. They can be readily added to the starting alkali tungstate or molybdate solution as soluble salts in the form of, for example, sodium hydrogen phosphate or sodium silicate. Other examples of heteroatoms of which soluble compounds are available are boron (as $B_2O_5$), arsenic (as sodium arsenate) and germanium (as sodium germanate). With these sources of B, As and Ge heteroatoms, as also with P and Si heteroatoms, there is usually no preparative difficulty such as, for instance, that caused by the precipitation of insoluble salts upon acidification of the alkaline reaction mass.

However, in the preparation of heteropoly acids of tungsten and of molybdenum, other than those wherein the heteroatom is P, Si, B, As or Ge, difficult problems are usually encountered. Soluble (more particularly, water-soluble) salts of some of the elements (e.g., iron, nickel, cobalt, chromium, titanium, aluminum, niobium, antimony, tin, vanadium and numerous others) are available (or can readily be prepared) as, for example, nitrates, chlorides, bromides, formates, acetates, etc. However, the addition of the soluble salts to the basic tungstate or molybdate solution, followed by acidification, generally results in excessive precipitation of tungstates or molybdates before the heteropoly acid is formed.

With heteroatoms such as, for example, Ti, Al and Nb and which are available in the form of their soluble salts, they do not remain soluble in aqueous (including aqueous acidic) solutions very long, forming insoluble products due to hydrolysis, decomposition, etc. In such cases, prior to the present invention, it has been either extremely difficult or not possible to obtain a commercially practical yield of the heteropoly acid by techniques heretofore known. When the central atom in the heteropoly acid was other than P, Si, B, As or Ge, yields by conventional methods have generally been in the range of from 1 to 10% of the heteropoly acid, (calculated with respect to the $WO_3$ or $MO_3$ in the starting basic tungstate or molybdate reactant), depending upon the particular heteroatom involved.

The present invention is based on our discovery that the incorporation of the fluoride ion (introduced in the form of, for example, hydrofluoric acid) into a water-soluble tungstate or molybdate solution (e.g., an alkali tungstate or an alkali molybdate solution), containing the source of the heteroatom or heteroatoms in a normally insoluble or low-solubility form, solubilizes or complexes the said heteratom(s) so that it remains in solution during preparation of the initial aqueous reaction mass and subsequent acidification to form the heteropoly acid. More particularly, we have found that we can dissolve compounds of various heteroatoms including, for example, insoluble oxides of aluminum, titanium and niobium, and use them as sources of the heteroatoms that are incorporated into the alkali-tungstate and/or alkali-molybdate starting solutions. Surprisingly and unobviously, too, it has been found that the heteroatom remains in solution during the process of reducing the pH of the alkali tungstate (and/or molybdate) solution through its intermediate form (e.g., para and meta state) to form the heteropoly acid.

The heteroatom or heteroatoms incorporated into the heteropolytungstic or heteropolymolybdic acids that are prepared in accordance with this invention can be any heteroatom of an elemental metal (including metalloid) that can be fluoride-solubilized or -complexed, but no particular advantages accrue when the heteroatom is, for example, P, Si, B, As or Ge. This is because such heteroatoms are available in soluble form and can be incorporated into heteropolytungstic or heteropolymolybdic acids with no particular difficulty due to the formation of insoluble products. Hence, the maximum benefiits of the invention are attained when the starting heteroatom-containing compound is one that is normally water-soluble or has a low solubility in water; and such starting compounds are, therefore, preferred.

The starting molybdenum or tungsten compound is a water-soluble compound or one that is convertible at the reaction temperature to a water-soluble molybdenum or tungsten compound. Ordinarily, the starting molybdenum or tungsten reactant is an ammonium molybdate or tungstate; an alkali-metal molybdate (e.g., sodium or potassium molybdate); or an alkali-metal tungstate (e.g., sodium or potassium tungstate). By "water-soluble," it is meant that the preformed or in situ-formed molybdenum or tungsten compound has at least some solubility in water at the reaction temperature.

If the fluoride-solubilized (including fluoride-complexed) heteroatom-containing compound is not initially a water-soluble compound, it is converted in situ to such a compound at the reaction temperature. In this water-soluble form, it can then readily condense with, for example, an ammonium or a sodium, potassium or other alkali-metal molybdate or tungstate to form an ammonium or an alkali-metal heteropolymolybdate or heteropolytungstate. This ammonium or alkali-metal heteropolymolybdate or heteropolytungstate is then converted in aqueous solution to the corresponding heteropolymolybdic or heteropolytungstic acid by any of the methods known to the art. Such methods include extraction with ether to form an ether-heteropoly acid complex from which the heteropoly acid is released by heating with water. Thereafter, it is isolated, usually as a crystalline product, by evaporation of the water. Or, the heteropoly acid can be obtained by bringing the aqueous liquid, reaction mass into contact with a cation-exchange material (e.g., a cation-exchange resin) on the hydrogen cycle thereby to remove the base, e.g., an alkali-metal or ammonium base, and to form the free acid in solution. The heteropoly acid can then be isolated in solid form, as is usually desired, by evaporation of the water thereby to crystallize the free acid.

SOURCE OF THE FLUORIDE ION

As has been indicated hereinbefore, it is essential in practicing the present invention that a source of a fluoride ion be introduced into an aqueous solution of a water-soluble tungstate or molybdate (e.g., an alkali-metal or an ammonium tungstate or molybdate) in addition to the source of the heteroatom.

Although hydrofluoric acid is particularly suitable as a source of the fluoride ion and is usually preferred for use, any other water-soluble inorganic fluoride can be employed including, for example, ammonium fluoride and the fluorides of the alkali metals (sodium, potassium, etc.), as well as the fluoride of such metals as aluminum, copper, silver, tin, vanadium and zinc. Ammonium hydrogen fluoride, sodium hydrogen fluoride, potassium hydrogen fluoride, and other acid fluorides corresponding to the aforementioned and other water-soluble inorganic fluorides also may be used as the source of fluoride ion.

Water-soluble, fluorine-containing compounds that decompose either slowly or rapidly in water also can be employed, e.g., tin tetrafluoride, titanium trifluoride, titanium tetrafluoride, and tungsten hexafluoride ($WF_6$), all of which disperse in water to yield the metal constituent and hydrofluoric acid. It will be understood, of course that when $WF_6$ is used as the source of the fluoride ion, then another source for the heteroatom must be chosen. The liberated acid then acts as a solubilizing or complexing agent; or, it also properly may be designated as an agent that promotes mutual solubility and compatibility characteristics between the reactants and the components thereof that are liberated in aqueous solution, as well as between the reactants and the reaction products.

In practicing the present invention, the source of the fluoride ion is used in an amount effective in increasing the solubility and complexing characteristics of the source of the heteroatom that is incorporated into the reaction mass; and/or that amount which is effective in otherwise improving the course and/or rate of the reaction. This amount can be that amount which is necessary to substantially completely dissolve the source of the heteroatom. Any amount (e.g., 100 or 200 or more weight percent) in excess of the amount required to effect this dissolution can be used but no particular advantages appear to accrue therefrom, and such excess has the disadvantage of unnecessarily increasing the cost of the method. Generally, the source of the fluoride ion, and by which is meant specifically at least one water-soluble, inorganic, fluorine-containing compound, is present in the reaction mass in an amount equivalent to from about 0.1 to about 10 weight percent (more particularly from about 0.5 to about 8 weight percent) calculated as F, of the total weight of the reaction mass (including both aqueous phase and solids therein).

We prefer to use hydrofluoric acid as the source of the fluoride ion and, still more preferably, an aqueous solution of hydrofluoric acid containing from about 40 to about 78 weight percent of HF. When HF is employed, it is preferably used in an amount which is the stoichiometrical equivalent of that required for reaction with the heteroatom-containing compound to form the desired fluoride of the said heteroatom. The use of a stoichiometrical or approximately stoichiometrical quantity of fluoride ion in the form of HF has the advantage of minimizing removal (of F ion) and conversion problems that are inherent in using solutions containing a fluoride. A minimum amount of fluoride ion, e.g., HF, is of course necessary in order to impart the desired solubilizing or complexing characteristics to the heteroatom-containing compound. However, the maximum amount is critical only to the extent that it may complicate unnecessarily the aforementioned removal and conversion problems, and add to the cost of the method.

General procedure

Taking a heteropolytungstic acid as illustrative of the heteropoly acid that is to be prepared, the following is illustrative of the general procedure that is followed:

An aqueous solution of a water-soluble tungstate is prepared by dissolving, for example, sodium tungstate ($Na_2WO_4 2H_2O$) in water. A solution or a slurry (dispersion) of the compound containing the heteroatom is also prepared. Taking niobium pentachloride ($NbCl_5$) as illustrative of the heteroatom-containing compound, the chosen amount of the said pentachloride is dissolved in sufficient water to decompose it, yielding $Nb_2O_5$ upon decomposition. Then, an aqueous solution of HF (e.g., reagent grade) is added to the $Nb_2O_5$ in an amount sufficient to dissolve it. The resulting solution and the solution of sodium tungstate are then admixed.

When a homogeneous (substantially homogeneous) solution or admixture has been obtained, there is slowly added thereto a mineral acid, e.g., reagent grade HCl, in an amount sufficient to form a strongly acidic solution, more particularly a solution having a pH not higher than about 2.0, e.g., a pH of from about 0.3 to about 2.0. (The pH of the solution must be reduced to a value at which the association of the heteroatom(s) with the tungsten or molybdenum atoms to form the heteropolytungstate or heteropolymolybdate compound can take place.)

The method of recovery of the heteropoly acid from the acidulated solutions can be any of those methods heretofore employed in isolating heteropolytungstic and heteropolymolybdic acids. For example, the product can be isolated by conventional ether-extraction technique; by contacting the acidulated solution with a cation-exchange material, e.g., by passage through a bed of a cation-exchange resin on the hydrogen cycle, as described in the aforementioned Bechtold U.S. Patent No. 2,503,991; or by using a combination of a cation-exchange resin and an anion-exchange resin as is more fully described and is broadly and specifically claimed in our aforementioned copending application Ser. No. 435,070, filed Feb. 24, 1965, and which by this cross-reference is made a part of the disclosure of the instant invention.

Illustrative examples of the heteroatoms and the sources thereof that can be used in practicing the present invention are, for instance, finely divided, elemental aluminum, antimony, chromium, cobalt, iron, nickel, niobium, tin, titanium and vanadium; and the oxides, hydroxides, and salts, especially salts of inorganic acids (e.g., nitrates, chlorides and bromides) of the aforementioned elemental substances.

As indicated hereinbefore under the heading "Source of the Fluoride Ion," the heteroatom or a plurality of heteroatoms and the source of the fluoride ion can be introduced into the reaction mass conjointly, that is, in the form of a water-soluble fluoride of a metal or metalloid, e.g., aluminum, copper, silver, tin, zinc, vanadium, etc.

The amount of water, which is preferably distilled or deionized water, used in forming the mixture or solution of starting reactants is not critical. Advantageously, the quantity of water is chosen so that the concentration of solids (total solids), on a net-dry basis, in the reaction mass is within the range of, by weight, from about 10% to about 50% of the said mass. (By "net-dry basis," it is meant that the percentage weight of solids is exclusive of any combined water of crystallization in the starting reactants.) Thus, it is desirable that the amount of water be sufficient so that insoluble matter in the reaction mass can be easily removed, e.g., by filtration, and then readily isolated from the filtrate by means such as previously have been mentioned.

The amount of the source of the heteroatom(s) in the aforementioned aqueous medium should be sufficient to provide at least 0.5 gram atom, more particularly from 0.5 (or from about 1.0) to about 1.5–2 gram atoms of the heteroatom(s) for each 12 gram atoms of tungsten or molybdenum in the intermediate or final tungsten-or molybdenum-containing product.

In general, the order of addition of reactants in forming the initial admixture is not critical and may be varied as desired or as may be required for optimum results, depending upon the particular reactants employed, their solubility or non-solubility characteristics, the particular ratios of reactants to each other that are used, and other influencing factors.

Taking HF as illustrative of the source of the water-soluble fluoride ion that is employed, an aqueous solution thereof may be added to a "solution" (including dispersion) of the source of the heteroatom, and/or to the solution of the water-soluble tungsten or molybdenum compound. The primary reactants (i.e., the solutions of (a) the source of the heteroatom and (b) the source of the water-soluble tungsten or molybdenum compound) may be brought into intimate association with each other in either order or conjointly. When a normally water-soluble (e.g., alkali-metal such as sodium or potassium) tungsten or molybdenum compound is used, the aqueous solution of the compound containing the heteroatom ordinary is added to the aqueous solution of the aforesaid water-soluble tungsten or molybdenum compound. As has been indicated, an aqueous solution of HF may be added to the solution of the source of the heteroatom before admixture with the other primary reactant, or after admixture, or both before and after admixture.

Thus, in preparing the solutions containing a water-soluble fluoride ion one can make up (a) a solution of, for example, sodium tungstate or sodium molybdate and (b) a solution of the desired fluoride, e.g., titanium fluoride, by dispersing titanium dioxide in water and adding sufficient HF to dissolve the oxide. Solutions (a) and (b) can then be mixed by adding the fluoride solution, (b), to the tungstate solution, (a). Another technique comprises dispersing an oxide of the desired heteroatom, e.g., $TiO_2$, in a solution of the alkali tungstate or molybdate, and then solubilizing the oxide by adding sufficient HF. One can also prepare solutions containing the water-soluble fluoride ion by adding a soluble salt of the heteroatom, e.g., aluminum chloride, to an alkali tungstate or molybdate solution. The aluminum salt is hydrolyzed, but the hydrolysis product is resolubilized by adding a sufficient amount of HF.

The temperature of reaction may vary considerably depending upon such influencing factors as previously have been mentioned with reference to the order of the addition of the reactants in forming the intial admixture. Thus, in some cases the reaction proceeds satisfactorily at ambient temperature (20°–30° C.). Ordinarily, however, the reaction is initiated at ambient or slightly above ambient temperature (e.g., 35°–50° C.), followed by further heating up to and at the reflux temperature (approximately 100° C.) of the reaction mass at atmospheric pressure. Evidence of the completion or approaching completion of the reaction is generally indicated by a change in the visual appearance of the reaction mass such as the development of a cloudiness or haze therein, and/or by the development of color.

In some cases, the reaction or digestion advantageously may be initiated at ambient temperature, continued at such temperature for a part of the total reaction period, and then heated to an elevated temperature for the remainder of the period of reaction. Alternatively, the reaction may be started cold and the reaction mass then heated gradually or intermittently to the maximum temperature of reaction. From the peak digestion temperature, the reaction mass may be slowly or rapidly cooled to ambient temperature; or, it may be allowed to "age" for a prolonged period of time, e.g., from 6 hours to a week or more at ambient temperature before isolation of the product. Generally, the reaction mass is filtered before such an aging process.

The reaction is ordinarily effected while the mixture is being agitated, e.g., with a stirring or other mechanical agitating means, by using a tumbling reactor, or by other conventional means.

In general, the aqueous liquid reaction mass is maintained at a temperature within the aforementioned range of from ambient temperature to approximately 100° C. at atmospheric pressure for a period of time sufficient to solubilize the source of the heteroatom and to render it mutually soluble and compatible with the water-soluble tungsten or molybdenum compound, and sufficient to at least initiate reaction between these primary reactants. This period may range, for instance, from 2 or 3 minutes to 6 or 8 hours or more, exclusive of any aging period at ambient temperature to which the reaction mass may have been subjected.

Any insoluble material in the aqueous liquid reaction mass is preferably removed by suitable means, e.g., by settling, decanting, filtration, centrifuging or the like, especially if the said liquid mass is subsequently to be contacted with a cation-exchange material on the H+ cycle to remove basic ions; or by a combination of such a treatment and subsequent contact with an anion-exchanging material on the OH− cycle to remove acidic ions. In this latter method, which is more fully described in our aforementioned copending application Ser. No. 435,070 with particular reference to the recovery of heteropolytungstic acid from a mineral acid-acidulated solution, a solution of a heteropolytungstate or heteropolymolybdate is contacted with a cation-exchange material to remove from the solution the cations present therein; next, the resulting solution is contacted with an anion-exchange material to remove the anions, including the anions of the mineral acid, e.g., HCl, $H_2SO_4$, used to reduce the pH of the solution. In practicing this invention, the anion-exchange material, e.g., an anion-exchange resin, also removes the fluoride ions.

Various, available cation-exchange substances may be employed in removing the cations from the liquid reaction mass. The cation-exchange material may be organic or inorganic, and of natural or synthetic origin. Among such materials may be mentioned gel zeolites, petroleum sludges, processed clays, the various phenolaldehyde resins containing sulfonic groups, and the various sulfonated, moderately cross-linked sulfonated polymers, the primary component of which forms a thermoplastic polymer when polymerized alone. A preferred cation-exchange substance is a sulfonated copolymer of styrene and divinyl benzene (cross-linking component) wherein the latter constitutes from about 6 to about 10 mole percent, and specifically about 6 mole percent of the copolymer; and has a void volume of from 30 to 50%, specifically about 40%. This latter cation-exchange substance is a commercially available product (Illco 211 of Illinois Water Treatment Co., Rockford, Ill.).

The anion-exchange material can be one of the various available anion-exchange resins. As a typical example, a weakly basic anion-exchange resin comprised of polyalkylamine functional groups attached to a copolymeric styrene-divinylbenzene matrix and sold as Dowex-3 by Dow Chemical Co. of Midland, Mich. is particularly effective.

Contacting of the liquid reaction mass with the aforementioned ion-exchange materials may be effected either by passing the liquid through a bed or column of the said materials; or by admixture in a vessel with the more finely divided ion-exchange materials, that is, by so-called "contact" filtration. The first-mentioned method, known as percolation filtration, is preferred.

The heteropolytungstic and heteropolymolybdic acids obtained by the method of this invention may be utilized in solution form, but for practical reasons (including marketing and shipping) the solid product, which is usually in crystalline form, is generally isolated from the reaction mass by any suitable means such as, for example, by evaporation of the aqueous reaction mass or filtrate. If further purification is desired, this can be effected, for instance, by redissolving in water and recrystallizing from aqueous solution one or more times.

The method of this invention may be carried out continuously, semi-continuously, or by batch operations.

A primary advantage of the present invention is the increased yield of product obtained as compared with the prior-art methods. In general, the method of the instant invention gives yields of 30% and more, usually of the order of 70–90% and higher, of $WO_3$ and $MO_3$ (combined in the form of heteropoly acid), which percentage is calculated on the basis of the amount of $WO_3$ or $MO_3$ in the starting basic tungstate or molybdate reactant. This compares with the previously mentioned yields of 1–10%, calculated on this same basis, that have been obtained by the prior-art methods.

The use of a fluoride ion as a solubilizing or complexing agent as herein set forth enables dissolution of substantially 100% (that is, almost all if not all) of the heteroatom-containing compound, and whereby the heteroatom is made available for incorporation with a water-soluble tungsten or molybdenum compound to yield a complex heteropolytungsten or heteropolymolybdenum compound that can then be converted to the corresponding heteropoly acids. The higher yields provided by the method constitute a significant practical and economic advantage, and this is especially true when the heteroatom is an expensive element such as, for example, niobium.

In order that those skilled in the art may better understand how the present invention can be carried into effect, the following examples are given by way of illustration and not by way of limitation. All parts and percentages are by weight unless otherwise stated.

Example 1 illustrates the preparation of a heteropoly acid, specifically tungstoniobic (niobotungstic) acid, by the prior-art technique, i.e., in the absence of a fluoride ion. The remaining examples illustrate the preparation of various heteropolytungstic and heteropolymolybdic acids in accordance with the present invention.

EXAMPLE 1

Conventional technique

Thirty-nine and six-tenths (39.6) grams of $Na_2WO_4 \cdot 2H_2O$ and 4.4 grams of $NbCl_5$ were added to 20 ml. of reagent-grade hydrochloric acid (approximately 37 wt. percent HCl). The slurry was added to 300 ml. of water, and the pH was lowered to 4.3 with reagent-grade HCl. The $NbCl_5$ decomposed to insoluble oxide ($Nb_2O_5$) at room temperature (about 25° C.). The mixture was digested by heating with agitation to 95° C. for one hour while a dilute solution of HCl was added. The pH was reduced to 1.0 and resulted only in a milky white suspension, which is indicative of decomposition and precipitation. The aqueous reaction mass was allowed to cool while the white solids settled. After filtering off the solids, extraction with ether resulted in only 2–3 ml. (about 2 grams) of the ether-heteropoly acid complex as a product. The results indicated very low conversion to tungstoniobic acid.

EXAMPLES ILLUSTRATING THE INVENTION

EXAMPLE 2

Preparation of tungstoniobic acid $NbCl_5$ was dissolved in 25 ml. water to decompose it. Then 5 ml. of reagent-grade hydrofluoric acid solution was added to dissolve the $Nb_2O_5$. (Reagent-grade hydrofluoric acid contains 48–50 wt. percent HF.)

Thirty-nine and five-tenths (39.5) grams of

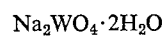

$$Na_2WO_4 \cdot 2H_2O$$

was dissolved in 300 ml. $H_2O$. To this was added the niobium fluoride solution. The pH dropped to 7.5.

While agitating and heating to about 90° C., 15 ml. reagent-grade hydrochloric acid was added dropwise until a pH of 2.0 was obtained. At this point, a slight precipitate formed. The pH was further reduced to 1.5 with 5 ml. of hydrochloric acid (37 wt. percent HCl), and the solution was filtered to give a clear solution which developed haze on standing. The total amount of HF, calculated as F, in the total reaction mass was about 0.67 wt. percent.

The solution was extracted with ether, yielding 21.5 grams (as compared with about 2 grams for the method of Example 1) of ether-tungstoniobic acid complex. The product recovered from the ether complex in the conventional manner was crystalline. It contained niobium in the range of 1%, and gave an X-ray diffraction pattern typical of heteropoly acids and isomorphous with 12-tungstophosphoric acid. The yield of tungstoniobic acid was about 74 wt. percent based on $WO_3$ recovered.

EXAMPLE 3

Preparation of tungstovanadic acid

Twenty-seven and one-tenth (27.1) grams of $V_2O_5$ was slurried in 100 ml. $H_2O$. Seventy-five (75) ml. of reagent-grade hydrofluoric acid was added to dissolve the $V_2O_5$. A clear, brown solution formed, and this later changed to a greenish-black solution.

The vanadium fluoride solution obtained as above-described was added to 3000 ml. $H_2O$ in which was dissolved 396 grams $Na_2WO_4 \cdot 2H_2O$. The pH after complete addition was 5.4 at 75° C. Digestion was continued for 1.25 hours to a temperature of 95° C. with slow addition of reagent hydrochloric acid to reduce the pH to 0.6. The final solution, after 200 ml. of HCl had been added, was a reddish-orange color and hazy, indicating the presence of a small amount of insoluble material. The amount of HF, calculated as F, in the total reaction mass was about 1.03 wt. percent.

After filtration, the solution was extracted with ether to yield 134.5 grams of ether-tungstovanadic acid complex. The tungstovanadic (vanadotungstic) acid was released from the ether complex by heating with water. Evaporation of the water yielded 91.5 grams of a crystalline product which dissolved in water to give a strongly acid solution and a slight haze. Recrystallization from water gave a product which disolved with significantly less haze. After drying at 70° C. overnight for conditioning, the material was chemically analyzed and was found to contain 2.0% vanadium. The theoretical vanadium content for $H_3(VW_{12}O_{40}) \cdot 5H_2O$ is 1.5%. X-ray diffraction examination showed crystalline material having a diffraction pattern similar to that of 12-tungstophosphoric acid. The yield of tungstovanadic acid was about 33 wt. percent based on $WO_3$ recovered.

From the foregoing, it will be seen that this example illustrates quiet clearly that the use of the fluoride ion as a solubilizing or complexing agent enabled the initial solubilization of $V_2O_5$ and the retention of vanadium in solution, thereby making the vanadium available for the formation of tungstovanadic acid.

EXAMPLE 4

Preparation of Tungstoferric Acid

Eight and six-tenths (8.6) grams of $Fe(NO_3)_3 \cdot 9H_2O$ was mixed with 56.2 grams $Na_2WO_4 \cdot 2H_2O$ in 300 ml. $H_2O$, yielding a brown, aqueous suspension. The addition of 75 ml. of 48 wt. percent hydrofluoric acid gave a clear solution. Heating to 90°–98° C. with agitation, while adding 50 ml. of reagent-grade HCl over a 1-hour period, resulted in a pH of 1.9. The solution was relatively clear with only a slight haze. (Normally, such solutions in the absense of HF decompose extensively and result in an excessive amount of precipitate.) Digestion was stopped after one hour at 90° C. The amount of HF, calculated as F, in the total reaction mass, was about 7.8 wt. percent.

After filtration, the solution was extracted with a mixture of 1:1 ether:hydrochloric acid to yield the ether-tungstoferric acid complex. Recovery of the tungstoferric (ferrotungstic) acid was achieved by low-temperature evaporation on a steam bath to precipitate the crystalline product. (Crystallization of the product also can be effected by allowing the ether-acid complex to evaporate at ambient temperature.)

The product dissolved in water to give an acid solution with only a slight haze. Spectrographic qualitative analysis showed 1–2% Fe content. X-ray diffraction examination showed the typical complex heteropoly acid pattern exemplified by 12-tungstophosphoric acid.

EXAMPLE 5

Preparation of Tungstoaluminic Acid

Dissolved 39.6 grams $Na_2WO_4 \cdot 2H_2O$ in 300 ml. $H_2O$, and to the resulting solution there was added 7.5 grams $Al_2(NO_3)_3 \cdot 9H_2O$. A white precipitate formed. The precipitate was dissolved by adding 10 ml. of 50% hydrofluoric acid. A slightly hazy solution remained.

About 15 ml. of reagent-grade hydrochloric acid was added to the hazy solution over a period of ½ hour. The temperature was raised to about 55°–60° C., and the pH dropped to 1.7. The amount of HF, calculated as F, in the total reaction mass, was about 1.4 wt. percent.

After cooling and filtering, the solution was extracted with a 1:1 mixture of ether and hyrochloric acid. Twenty-five and five-tenths (25.5) grams of ether-tungstoaluminic acid complex was recovered.

The tungstoaluminic (aluminotungstic) acid was recovered by decomposing the aforesaid complex in 28 ml. of warm water. A slight precipitation of tungstic acid occurred, and this was removed by filtration before evaporating to crystallize the tungstoaluminic acid from the solution. The product was dried on a steam bath. It dissolved in water to give a clear, acidic solution. X-ray diffraction examination showed the typical heteropoly diffraction pattern exemplified by 12-tungstophosphoric acid. The yield of tungstoaluminic acid was about 92 wt. percent based on $WO_3$ recovered.

EXAMPLE 6

Preparation of Molybdovanadic Acid

Eighteen and one-tenth (18.1) grams of $V_2O_5$ was slurried in 100 ml. $H_2O$, and to the resulting slurry was added 75 ml. of reagent-grade hydrofluoric acid to dissolve the $V_2O_5$. A clear, greenish-black solution was obtained.

The vanadium fluoride solution was added with agitation to 3000 ml. of $H_2O$ in which was dissolved 145.1 grams of $Na_2MoO_4 \cdot 2H_2O$. The pH of the reaction mixture after all of the vanadium fluoride had been added was 3.4 at 42° C. Digestion of the reaction mixture was continued with agitation for 25 minutes to a temperature of 83° C. while slowly adding reagent hydrochloric acid to reduce the pH to 0.35. The final solution, obtained after 100 ml. of HCl had been added, was a clear, yellowish green. The amount of HF, calculated as F, in the total reaction mass was about 1.14 wt. percent.

The yellowish green solution was then passed through a bed of cation-exchange resin (Illco 211) on the $H^+$ cycle in order to remove $Na^+$. The resulting molybdovanadic (vanadomolybdic) acid was recovered by evaporation of the solution at ambient temperature (about 25° C.). The estimated yield of product was about 55 wt. percent based on $Mo_3$. This example illustrates the use of a fluoride ion to hold vanadium in a solution containing molybdenum.

EXAMPLE 7

Preparation of Molybdotitanic Acid

A solution of a water-soluble molybdate was prepared by dissolving 300 grams of ammonium paramolybdate in 1000 ml. of water at ambient temperature (20°–30° C.). A solution of a source of a heteroatom, specifically Ti, was prepared by dissolving 6.4 grams of $TiO_2$ in 25 ml. of reagent-grade hydrofluoric acid solution by first heating the admixture to 70° C. with agitation. Ammonium fluoride, $NH_4F$ (5.93 grams), was added to the resulting solution in order to facilitate the dissolution of the $TiO_2$ in the aqueous HF solution, thereby obtaining a titanium fluoride complex solution.

The titanium fluoride complex solution was added to the solution of ammonium paramolybdate, yielding a solution wherein the weight precentage of F ions, derived from HF and $NH_4F$, was about 1.2 wt. percent based on the total weight of the admixed solutions. Seven hundred (700 ml. of this solution was passed through a column of a cation-exchange material, specifically a cation-exchange resin (Illco 211) on the hydrogen cycle to remove $NH_4^+$. The effluent was concentrated by slow evaporation to crystallize molybdotitanic (titanomolybdic) acid from the solution. The product was a solid that could be ground to a powder and which dissolved readily in water to give an acid solution. The yield was about 48 wt. percent based on $Mo_3$.

What is claimed is:

1. In a method for the preparation of a heteropolytungstic or a heteropolymolybdic acid wherein a water-soluble compound containing a tungstate radical or a molybdate radical is reacted with a water insoluble heteroatom containing substance comprising the heteroatom to be introduced into the aforesaid heteropoly acids, and the reaction is carried out in an aqueous medium with acidic conditions prevailing during at least the latter part of the reaction period, the improvement which consists in carrying out the said reaction in the presence of a fluoride ion source in an amount sufficient to solubilize the heteroatom containing substance.

2. The improvement in a method as in claim 1 wherein the heteroatom is selected from the group consisting of aluminum, antimony, chromium, cobalt, iron, nickel, niobium, tin, titanium and vanadium.

3. The improvement as in claim 1 wherein the fluoride ion is derived from hydrofluoric acid.

4. The improvement in a method as in claim 1 wherein the heteropoly acid is heteropolytungstic acid, the water-soluble compound is an alkali-metal or ammonium tungstate, the heteroatom is niobium, and the heteropolyacid that is recovered is tungstoniobic acid.

5. The improvement as in claim 4 wherein the heteroatom is vanadium, and the heteropoly acid that is recovered is tungstovanadic acid.

6. The improvement as in claim 4 wherein the heteroatom is ferric iron, and the heteropoly acid that is recovered is tungstoferric acid.

7. The improvement as in claim 4 wherein the heteroatom is aluminum, and the heteropoly acid that is recovered is tungstoaluminic acid.

8. The improvement in a method as in claim 1 wherein the heteropoly acid is heteropolymolybdic acid, the water-soluble compound is an alkali-metal or ammonium molybdate, the heteroatom is vanadium, and the heteropoly acid that is recovered is molybdovanadic acid.

9. The improvement as in claim 8 wherein the heteroatom is titanium, and the heteropoly acid that is recovered is molybdotitanic acid.

10. A method of preparing a heteropoly acid of the group consisting of heteropolytungstic and heteropolymolybdic acids which comprises:
 (I) contacting, in an aqueous solution and at a temperature within the range of from about 20° C. to about 100° C.,
  (a) sodium or ammonium tungstate or molybdate, and
 (b) a substance comprising the heteroatom to be introduced into the said heteropoly acid,
said aqueous solution containing a fluoride ion in an amount corresponding to at least 0.1 weight percent hydrofluoric acid, calculated as F, based on the total weight of the reaction mass, and the amount of the substance of (b) being sufficient to provide at least 0.5 gram atom of the aforesaid heteroatom for each 12 gram atoms of tungsten or molybdenum in the aforementioned heteropoly acid; and
 (II) reducing the acidity of the said aqueous solution to a pH not higher than about 2.0 whereby the desired heteropoly acid is formed in solution.

11. The method as in claim 10 which includes the additional step of isolating from the reaction mass the heteropoly acid of tungsten or molybdenum that is formed.

12. The method as in claim 11 wherein the substance of (b) is initially in the form of an oxide, hydroxide or salt with an inorganic acid of the heteroatom.

13. The method as in claim 11 wherein the reactant of (a) is sodium tungstate and the substance of (b) is initially in the form of an oxide, hydroxide or salt with an inorganic acid of at least one heteroatom selected from the group consisting of aluminum, antimony, chromium, cobalt, iron, nickel, niobium, tin, titanium and vanadium.

14. The method as in claim 13 wherein the reactant of (a) is sodium or ammonium molybdate.

15. The method as in claim 11 wherein the substance of (b) is incorporated in the aqueous solution in the form of a fluoride of the heteroatom.

16. The method as in claim 15 wherein the fluoride of the heteroatom is obtained by dissolving a non-fluorine-containing compound of the heteroatom in aqueous hydrofluoric acid, said heteroatom being selected from the group consisting of aluminum, antimony, chromium, cobalt, iron, nickel, niobium, tin, titanium and vanadium.

17. The method as in claim 10 wherein the aqueous solution contains a fluoride ion in an amount corresponding to from about 0.5 to about 10 weight percent hydrofluoric acid, calculated as F, based on the total weight of the reaction mass.

References Cited

UNITED STATES PATENTS

| | | | |
|---|---|---|---|
| 2,503,991 | 4/1950 | Bechtold | 23—140 |
| 2,744,928 | 5/1956 | Smith et al. | 23—140 |
| 3,227,518 | 1/1966 | Kennedy | 23—140 X |
| 3,243,258 | 3/1966 | Smit | 23—140 X |
| 3,288,562 | 11/1966 | Laferty | 23—23 |
| 3,361,518 | 1/1968 | Chiola et al. | 23—23 |

OSCAR R. VERTIZ, *Primary Examiner.*

HERBERT T. CARTER, *Assistant Examiner.*

U.S. Cl. X.R.

23—139, 140

UNITED STATES PATENT OFFICE
CERTIFICATE OF CORRECTION

Patent No. 3,428,415                                                                        February 18, 1969

Vincent Chiola et al.

It is certified that error appears in the above identified patent and that said Letters Patent are hereby corrected as shown below:

Column 1, line 25, "Sn Ti" should read -- Sn, Ti --. Column 3, line 24, "benefiits" should read -- benefits --; line 26, "water-soluble" should read -- water-insoluble --. Column 4, line 70, "($Na_2WO_42H_2O$)" should read -- ($Na_2WO_4.2H_2O$) --. Column 6, line 11, "ordinary" should read -- ordinarily --. Column 7, line 10, "anion-exchanging" should read -- anion-exchange --; line 73, cancel "centage is calculated on the basis of the amount of $WO_3$" and insert the same after line 75, same column 7. Column 9, line 31, "disolved" should read -- dissolved --; line 41, "quiet" should read -- quite --. Column 11, line 2, "(700 ml." should read -- (700) ml. --.

Signed and sealed this 7th day of April 1970.

(SEAL)
Attest:

EDWARD M.FLETCHER, JR.                                         WILLIAM E. SCHUYLER, JR
Attesting Officer                                                    Commissioner of Patents